(12) United States Patent
Mello et al.

(10) Patent No.: US 6,511,370 B1
(45) Date of Patent: Jan. 28, 2003

(54) METHOD OF DOCKING PORK BELLIES

(75) Inventors: Frank C. Mello, West Point, MS (US); Jeffrey A. Williams, Calhoun, GA (US)

(73) Assignee: Sara Lee Corp., Winston-Salem, NC (US)

(*) Notice: Subject to any disclaimer, the term of this patent is extended or adjusted under 35 U.S.C. 154(b) by 0 days.

(21) Appl. No.: 09/789,209

(22) Filed: Feb. 20, 2001

(51) Int. Cl.⁷ .............................................. A22C 18/00
(52) U.S. Cl. ....................................... 452/193; 426/264
(58) Field of Search ................................. 452/193, 175; 426/264, 480; 99/636, 637, 643

(56) References Cited

U.S. PATENT DOCUMENTS

| | | |
|---|---|---|
| 1,940,035 A | 12/1933 | Washburn |
| 3,595,679 A * | 7/1971 | Schoch et al. ............... 426/264 |
| 3,901,140 A | 8/1975 | Dohm, Jr. |
| 3,901,981 A | 8/1975 | Draudt |
| 4,195,098 A | 3/1980 | Otto |
| 4,522,093 A * | 6/1985 | Rattmann ....................... 83/42 |
| 4,552,048 A * | 11/1985 | Wallace et al. ................. 83/23 |
| 4,957,756 A | 9/1990 | Olander et al. |
| 5,064,667 A | 11/1991 | Mally |
| 5,195,924 A | 3/1993 | Gagliardi, Jr. |
| 5,481,466 A | 1/1996 | Carey |
| 5,567,460 A | 10/1996 | Afman |
| 5,669,810 A | 9/1997 | Ware et al. |
| 5,976,608 A | 11/1999 | Gagliardi, Jr. |
| 5,997,925 A * | 12/1999 | Wilson et al. ............... 426/332 |
| 6,039,995 A | 3/2000 | Zamzow |
| 6,045,841 A * | 4/2000 | Singh et al. ................. 426/243 |
| 6,051,264 A | 4/2000 | Afman et al. |
| 6,186,059 B1 | 2/2001 | Mello et al. |

* cited by examiner

Primary Examiner—Peter M. Poon
Assistant Examiner—Joan M. Olszewski
(74) Attorney, Agent, or Firm—Kilpatrick Stockton LLP

(57) ABSTRACT

A method of processing pork bellies to produce sliced bacon comprises receiving at least one pork belly, having a flank end and a shoulder end, from a pork belly treating process. The flank end and the shoulder end of the at least one pork belly is docked. The docked pork belly is placed on a slicing machine and sliced to produce sliced bacon.

22 Claims, 5 Drawing Sheets

METHOD OF DOCKING PORK BELLIES

BACKGROUND OF THE INVENTION

1. Field of the Invention

The present invention relates to the processing of pork bellies to produce sliced bacon and more particularly to a method of docking pork bellies prior to slicing.

2. Description of the Prior Art

In the production of bacon, pork bellies are conventionally processed into pressed slab bacon. The slab bacon bellies are then chilled for slicing. The chilled bellies are typically sliced from end to end. When slicing pork bellies using these conventional methods, a significant amount of bacon slices that do not qualify for the highest quality bacon ("No. 1 bacon") are generated. The lower grade bacon slices are normally sorted out, packaged and sold as a lower grade of bacon. This method is inefficient in that the entire bacon slab must be sliced to obtain the more select part of the bacon slab. By having to slice the entire bacon slab to obtain the highest quality bacon, the slicing lines are slowed which results in lower efficiencies. Additionally, conventional slicing methods result in lower slicing yields.

SUMMARY OF THE INVENTION

The present invention relates to a method of processing pork bellies to produce sliced bacon that overcomes the inefficiencies and difficulties in the prior art. In one embodiment a method of the present invention comprises receiving at least one pork belly, having a flank end and a shoulder end, from a pork belly treating process, docking the flank end and the shoulder end from the at least one pork belly, placing the docked pork belly on a slicing machine, and slicing the docked pork belly to produce sliced bacon. As used herein, the term "dock" means to remove or cut off.

A pork belly treating process may comprise curing pork bellies, smoking the pork bellies, chilling pork bellies and pressing the pork bellies into substantially rectangular shapes. A pork belly is preferably docked after the pork belly is cured, smoked and chilled. A pork belly may be docked before it is pressed into a substantially rectangular shape, after it is pressed and through storage, or just prior to slicing. A pork belly is preferably docked from none up to six inches on each or either end of the pork belly.

In another embodiment, a method of processing pork bellies of the present invention comprises receiving at least one pork belly, having a flank end and a shoulder end, from a pork belly treating process, removing the flank end and the shoulder end from the at least one pork belly, placing the docked pork belly on a slicing machine, and slicing the docked pork belly to produce sliced bacon.

In the production of bacon and other meat products, the tendency is to realize the maximum value of the meat by utilizing as much meat as possible. In contrast, the present invention recognizes that by docking the ends of the pork bellies (i.e., not using the entire pork belly), such that only the highest quality bacon is produced, a bacon manufacturer can produce more of the highest quality bacon in a shorter amount of time. Therefore, a manufacturing process utilizing the present invention increases its economic efficiency by docking the ends of the pork belly and only producing the highest quality bacon. In addition, the docked ends may be used for making other types of bacon.

The present invention advantageously provides a new method of processing pork bellies to produce sliced bacon.

It is an advantage of the present invention to provide a method of processing pork bellies to produce sliced bacon which reduces the cost of producing the highest quality sliced bacon.

It is a further advantage of the present invention to provide a method of processing pork bellies to produce sliced bacon which reduces the time required to produce the highest quality sliced bacon.

A still further advantage of the present invention is to increase the slicing yield of pork bellies and bacon slabs.

The present invention also advantageously speeds up the slicing lines in the production of sliced bacon.

Additional details and advantages of the present invention will become apparent from the following more detailed description.

DETAILED DESCRIPTION

A method of processing pork bellies to produce sliced bacon comprises receiving at least one pork belly, having a flank end and a shoulder end, from a pork belly treating process, docking the flank end and the shoulder end from the at least one pork belly, placing the docked pork belly on a slicing machine, and slicing the docked pork belly to produce sliced bacon. In docking the pork belly, the less desirable parts of the slab bacon are removed. A pork belly treating process may comprise curing pork bellies, smoking pork bellies, and chilling pork bellies. In an embodiment of the present invention, the flank end and the shoulder end of a pork belly is docked after the pork belly is chilled. In another embodiment of the present invention, the flank end and shoulder end are docked from a pork belly after the pork belly is pressed into a substantially rectangular shape. The flank end and the shoulder end of the pork belly may be docked up to six inches. In another embodiment, the pork bellies are docked just before the bellies are sliced to produce sliced bacon.

In another embodiment, a method of processing pork bellies to produce sliced bacon comprises receiving at least one pork belly, having a flank end and a shoulder end, from a pork belly treating process, removing the flank end and the shoulder end from the at least one pork belly, placing the docked pork belly on a slicing machine, and slicing the docked pork belly to produce sliced bacon. The flank end and the shoulder end may be removed by cutting off the flank end and the shoulder end of the pork belly perpendicular to its length. The flank and shoulder ends may each be docked up to six inches. In one embodiment, the flank end and the shoulder end may each be docked one inch. In some embodiments, only the shoulder end or only the flank end is docked. In one embodiment, the pork bellies are docked after the bellies are pressed, but before the bellies are stacked for storage and ultimate slicing to produce sliced bacon. In another embodiment, the pork bellies are docked after the bellies are pressed and stacked for storage. In a further embodiment, the pork bellies are docked just prior to slicing.

The pork belly treating process may also comprise curing the pork belly, smoking the pork belly and chilling the pork belly. The flank end and the shoulder end are preferably removed from the pork belly after it is chilled although the ends may be removed prior to curing, prior to smoking or prior to chilling the pork belly. In another embodiment, the pork belly is also pressed into a substantially rectangular shape. The shoulder and flank ends are preferably removed after the pork belly is pressed into a substantially rectangular shape and chilled.

Figure 1:
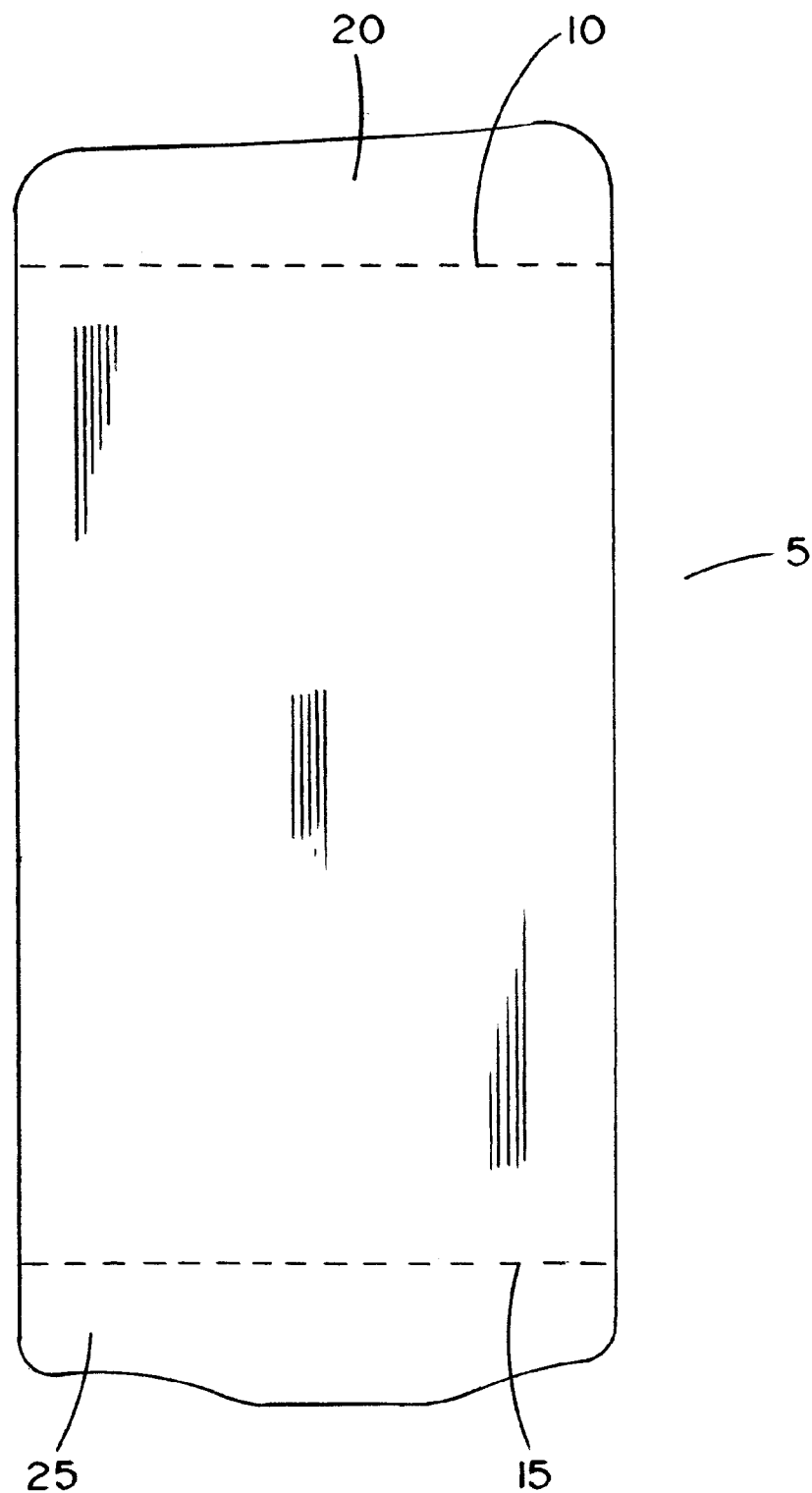
FIG. 1 is a plan view of a pork belly.

Referring now to the figures, FIG. 1 shows a plan view of a pork belly 5 or bacon slab. The pork belly 5 in FIG. 1 has a flank end 20 and a shoulder end 25. The pork belly is preferably docked perpendicular to the length of the pork belly 5. In a preferred embodiment, both the flank end 20 and the shoulder end 25 are docked, as shown generally by dashed lines 10, 15 in FIG. 1. The amount that is docked varies depending on the type and quality of sliced bacon being produced. Generally, up to six inches are docked on each end of the pork belly.

Figure 2:
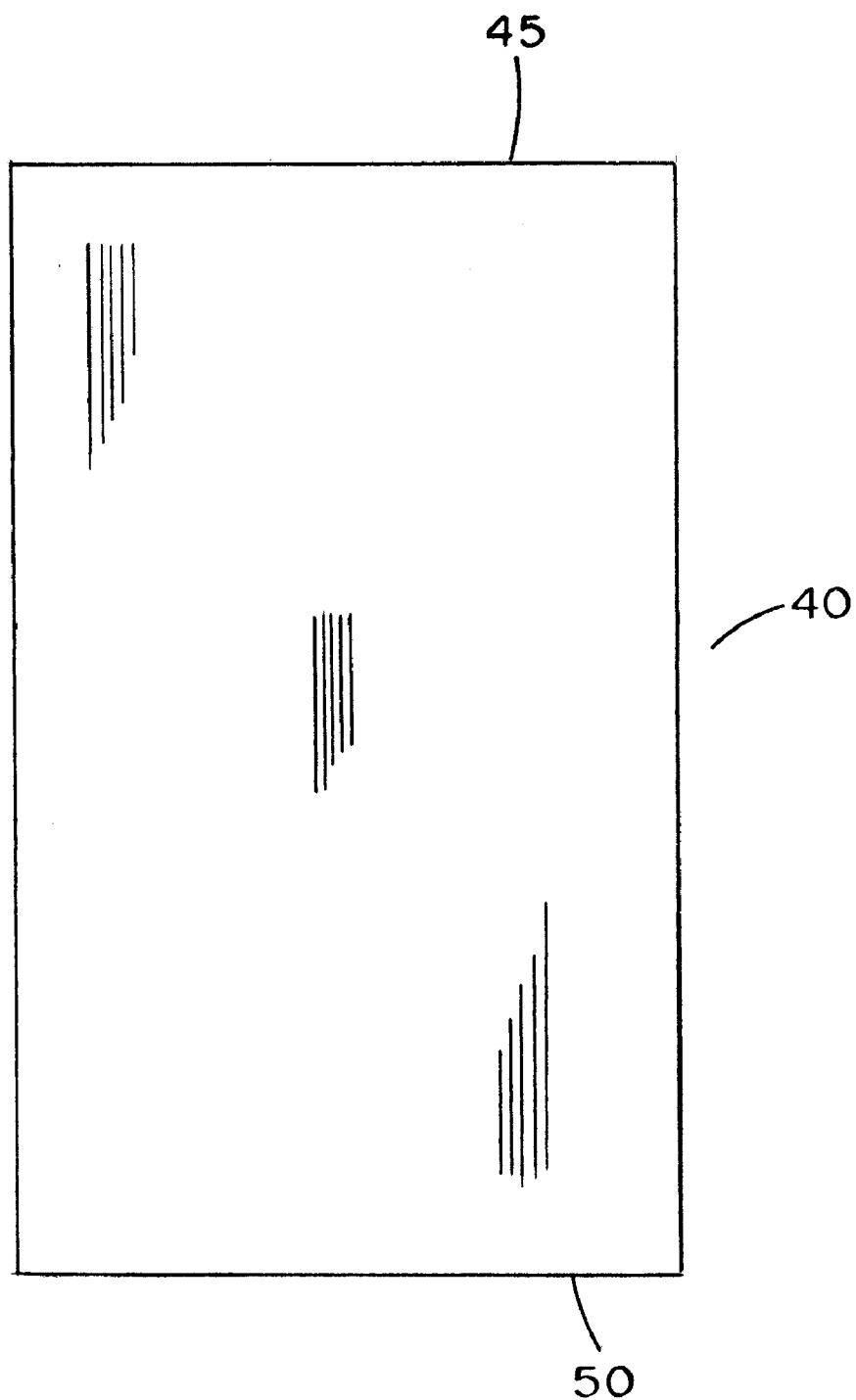
FIG. 2 is a plan view of a docked pork belly produced using an embodiment of a method of the present invention.

FIG. 2 shows a docked pork belly 40. The pork belly 40 in FIG. 2 is shown having a docked flank end 45 and a docked shoulder end 50.

Figure 3:
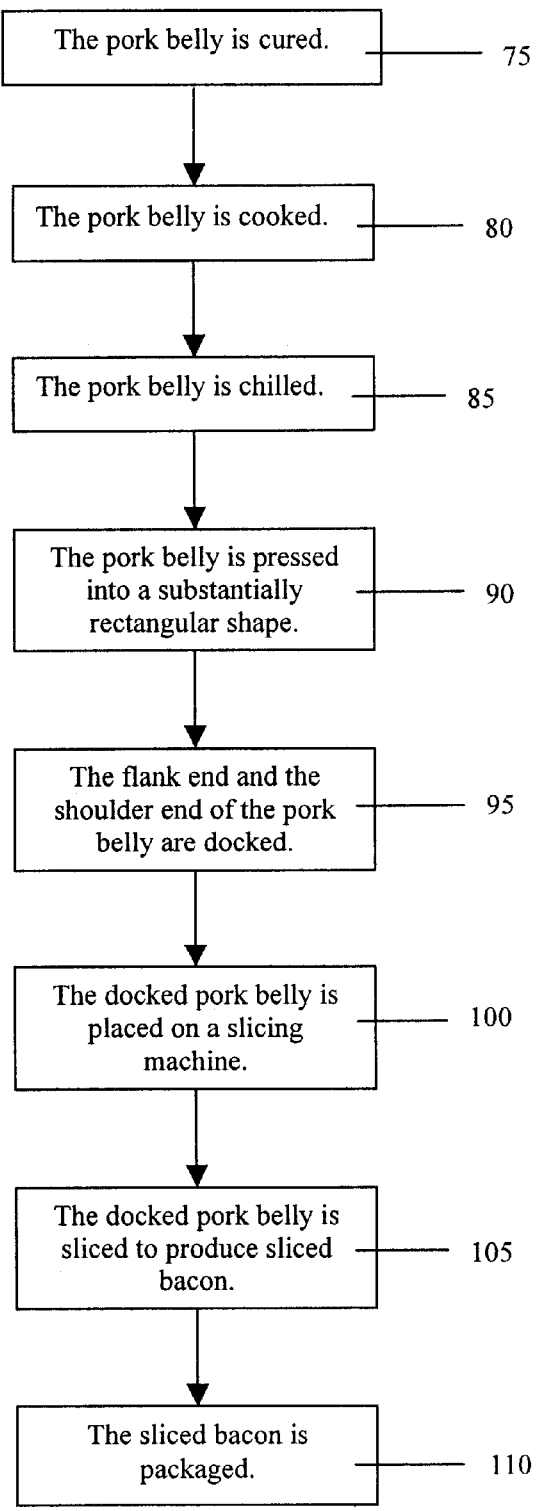
FIG. 3 is a flow chart of a method of the present invention for processing pork bellies.

FIG. 3 is a flow chart which illustrates an embodiment of a method of the present invention for processing pork bellies. In a pork belly treating process, a pork belly is first typically cured 75. A pork belly may be cured in a number of ways well known in the art, such as injecting the pork belly with a curing solution. After the pork belly is cured, the pork belly is usually cooked. Methods for cooking pork bellies are well known in the art. In one embodiment, of the present invention, the pork belly is cooked by smoking 80 the pork belly. Depending on the smoking desired, the pork belly usually remains in the smokehouse for one to five hours and the pork belly is typically cooked to a core temperature of from about 118° F. to about 140° F.

After the pork belly is cooked and preferably prior to slicing, the pork belly is preferably chilled 85 to facilitate slicing. For example, prior to slicing, the pork belly may be chilled to a temperature of from about 22° F. to about 28° F. The pork belly may also be pressed 90 into a substantially rectangular shape using methods and apparatuses known in the art. Pressing the bacon into a substantially rectangular shape results in more uniform slices of bacon.

The flank end and the shoulder end of the pork belly may be docked 95 at various stages in the pork belly treating process. The ends are preferably docked after the pork belly is chilled and pressed into a substantially regular shape. In another embodiment, the ends are docked before the pork belly is pressed. By docking the ends of the pork belly, the cost of producing the highest quality sliced bacon and the time required to produce the highest quality sliced bacon are reduced. The flank end and the shoulder end of the pork belly may be docked up to six inches.

After the flank end and the shoulder end are docked 95, the docked pork belly is placed 100 on a slicing machine and sliced 105 to produce sliced bacon. The sliced bacon may then be packaged 110 for sale.

Figure 4:
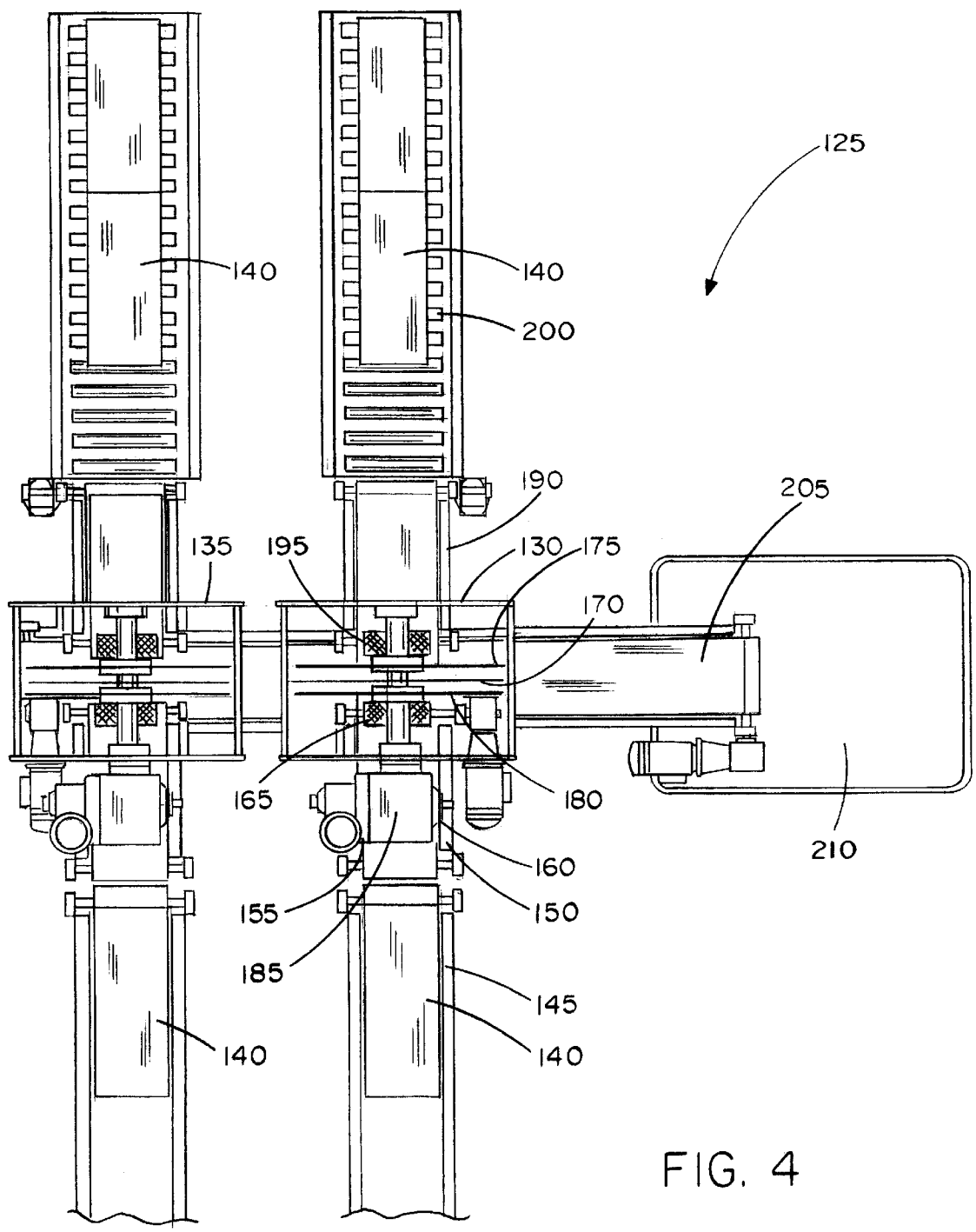
FIG. 4 is a top elevational view of an embodiment of an apparatus of the present invention for docking pork bellies.
Figure 5:
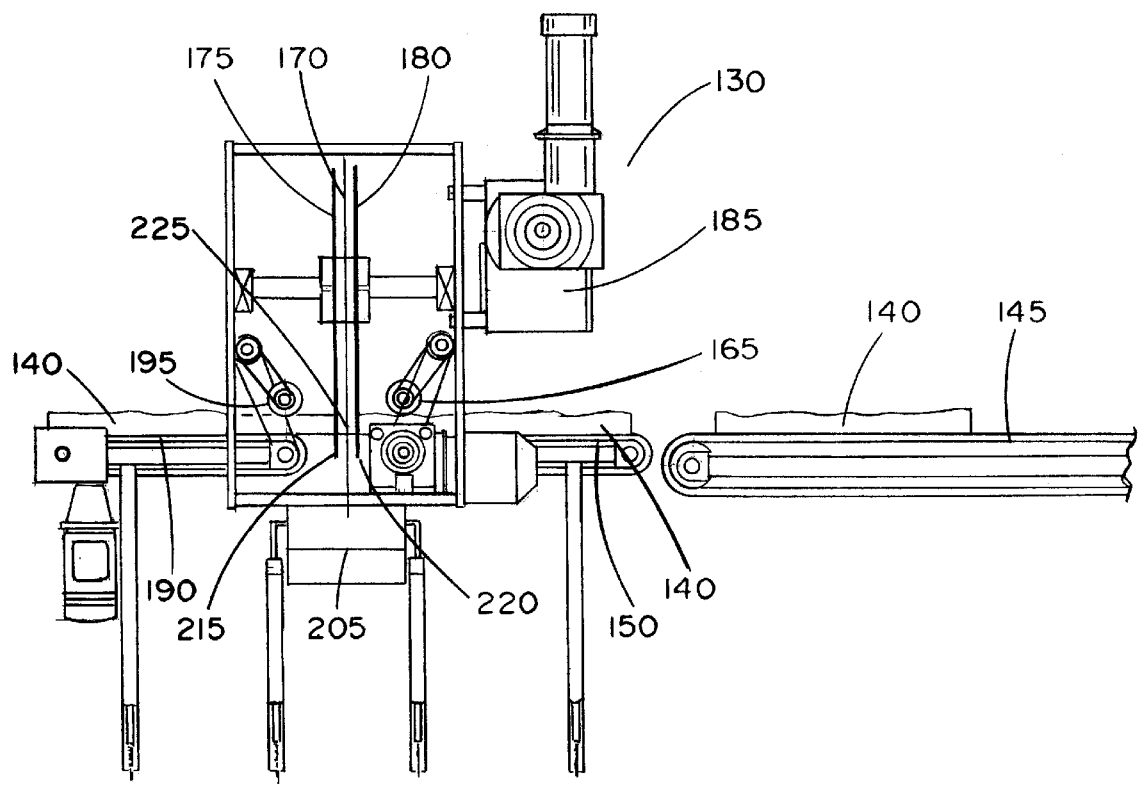
FIG. 5 is a side elevational view of an embodiment of an apparatus of the present invention for docking pork bellies.

FIGS. 4–5 illustrate an embodiment of an apparatus 125 of the present invention for docking pork bellies. FIG. 4 is a top elevational view of an apparatus 125 of the present invention for docking pork bellies. FIG. 5 is a side elevational view of an embodiment of an apparatus of the present invention for docking pork bellies. The embodiment shown includes two in-line belly dockers 130,135. Other embodiments may include more dockers per apparatus or only one docker per apparatus.

Pork bellies 140 are received from a pork belly treating process. The apparatus 125 of the present invention may receive the pork bellies 140 at various stages of the pork belly treating process. For example, the pork bellies may be docked after the bellies are cured, after the bellies are cooked, after the bellies are chilled or after the bellies are pressed. In one embodiment, the apparatus 125 receives the pork bellies 140 after the bellies are pressed.

The movement and docking of pork bellies will be described by discussing one of the dockers 130. Pork bellies are similarly moved and docked through the other docker 135. The pork bellies 140 may arrive at a docker 130 of the present invention on a conveyor 145 from another processing apparatus, such as a pressing apparatus. Examples of conveyors useful in the present invention are commercially available from Warrick Equipment Company. The conveyor drives (i.e., brake motors) should be of sufficient design to withstand rapid cycles (starting and stopping). Examples of suitable brake motors include drives manufactured by and commercially available from Demag Crane and Components of Cleveland, Ohio. The bellies 140 are conveyed to the docker 130 on a docking infeed conveyor 150. The bellies 140 are shifted to a fixed side guide 160 throughout the docker 130 by a powered side plow 155. The bellies 140 are conveyed end-to-end by the docking infeed conveyor 150 and a powered overhead feed roller 165. The pressure of the overhead feed roller 165 is developed with an air cylinder and back relieving regulator.

The bellies 140 may move through each docker 130,135 at a rate of fourteen bellies per minute. The bellies 140 are supplied to the dockers 130,135 with either the shoulder end or the flank end leading. In this embodiment, it is important that the same end of each belly entering the docker is leading. For example, a greater amount of the pork belly may be docked from the flank end than from the shoulder end. In this embodiment, the bellies 140 are also preferably aligned such that the flank end of one belly is proximate to the shoulder end of the next belly, forming a seam.

Before the pork bellies 140 are docked, the docker 130 must distinguish the pork bellies 140. One way in which the docker 130 may distinguish the pork bellies 140 is to locate the seams between the shoulder ends and the flank ends of the pork bellies. In the embodiment shown in FIG. 4, the seam between the pork bellies are detected using an "optical curtain" 170. The optical curtain 170 may be a series of laser beams aligned horizontally to detect the absence of meat and, thus, to locate the seam between the pork bellies.

In the embodiment shown, after the optical curtain 170 locates the seam between the pork bellies, the pork bellies are stopped and the ends are docked. The docker 130 includes two blades 175,180, each blade 175,180 having opposing shear bars 215,220 as shown in FIG. 5. The shear bars 215,220 are stationary blocks that the blades 175,180 slide against to cut the ends from the pork bellies. In one embodiment, a knife indexer 185 rotates the blades 175,180 through the pork bellies. The knife indexer 185 may comprise a rotating cam and an engaged clutch motor. The blades 175,180 may be rotated one hundred and eighty degrees (180°) through the pork bellies to dock the ends. The index time on the knife indexer 185 may be adjusted to set the time it takes for the blades 175,180 to rotate through one hundred and eighty degrees. A knife indexer 185 for use in the present invention may be a one hundred and eighty degree rotary indexer sized to withstand the speeds and forces required in docking the pork bellies. Examples of suitable knife indexers for use in the present invention are manufactured by Ferguson of St. Louis, Mo. (commercially available from Industrial Apparatus of Kennesaw, Ga.), Cambot (Commercial Cam Company, Inc.) of Smyrna, Ga. (commercially available from Automation Components, Inc. of Smyrna, Ga.), and Stelron Components, Inc. of Mahwah, N.J.

The amount of meat docked from the pork bellies 140 may be controlled by adjusting the position of the blades 175,180 and the optical curtain 170. It may be desirable to remove more meat from the flank end of the pork belly than from the shoulder end.

For example, with a pork belly that is twenty-six inches long, it may be desirable to remove one inch from the shoulder end and two inches from the flank end. In this embodiment, the blades should be three inches apart. The optical curtain is positioned between the two blades. If the pork bellies enter the docker with the shoulder end leading, then the optical curtain will be about one inch from the first blade. If the pork bellies enter the docker with the flank end leading, then the optical curtain will be about two inches from the first blade. In this embodiment, the index time of the knife indexer may be 0.5 seconds.

After the optical curtain detects the seam between two pork bellies, the blades rotate and dock the ends from the pork belly. A portion of meat from the shoulder end of one belly is docked by one of the blades and a portion of meat from the flank end of another belly is docked by the other blade. If different amounts (i.e., lengths) of meat are being docked from the flank end and the shoulder end, it is important to position the pork bellies such that the same end is leading (e.g., the flank end of a first pork belly forms a seam with the shoulder end of a second pork belly).

After the ends of the pork bellies 140 are docked, the pork bellies 140 leave the docker 130 on a docking outfeed conveyor 190 using a powered overhead feed roller 195. Other pork bellies enter the docker 130 on the docking infeed conveyor 150. In the embodiment shown, the pork bellies 140 enter and leave the docker 130 one pork belly at a time.

If a pork belly enters the docker 130 on the docking infeed conveyor 150 with its shoulder end leading and proximate to the flank end of the pork belly in front of it such that there is a seam between the two bellies, the pork belly is advanced until the optical curtain 170 detects the seam. FIG. 5 illustrates a seam 225 between two adjacent pork bellies 140. Once the seam is detected, the first blade 180 docks the shoulder end from one pork belly while the second blade 175 docks the flank end from the preceding belly. The pork belly is then advanced until the optical curtain 170 detects the seam between the pork belly and a subsequent pork belly, and movement stops. The second blade 175 then docks the flank end from the pork belly and the first blade 180 docks the shoulder end from the next undocked belly. The docked pork belly then leaves the docker 130 on the docking outfeed conveyor 190.

From the docking outfeed conveyor 190, the docked pork belly may be transferred to another conveyor, such as a gravity roller conveyor 200, for transport to packaging, palletizing or other processing.

The docked ends from the pork bellies may be taken away on a conveyor 205 to a vat 210. In some embodiments, the docked ends may be further processed and sold as ground bacon or diced bacon. In other embodiment, the docked ends may be discarded.

The apparatus of the present invention preferably includes the appropriate controls for operation and safety guards known to those of ordinary skill in the art.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. A method of processing pork bellies to produce sliced bacon, comprising:

receiving at least one pork belly, each pork belly having a first end and a second end, from a pork belly treating process;

docking the first end from a pork belly and the second end from a pork belly simultaneously;

placing the docked pork belly on a slicing machine; and slicing the docked pork belly to produce sliced bacon.

2. The method of claim 1, wherein the pork belly treating process comprises curing the at least one pork belly and smoking the at least one pork belly.

3. The method of claim 2, wherein the pork belly treating process further comprises chilling the at least one pork belly.

4. The method of claim 3, wherein the pork belly treating process further comprising pressing the at least one pork belly into a substantially rectangular shape.

5. The method of claim 1, wherein the first end and the second end are each docked up to six inches.

6. A method of processing pork bellies to produce sliced bacon, comprising:

receiving at least one pork belly, each pork belly having a first end and a second end, from a pork belly treating process;

docking the first end and the second end from each pork belly simultaneously;

placing the docked pork belly on a slicing machine; and slicing the docked pork belly to produce sliced bacon.

7. The method of claim 6, wherein the pork belly treating process comprises curing the at least one pork belly and smoking the at least one pork belly.

8. The method of claim 7, wherein the pork belly treating process further comprises chilling the at least one pork belly.

9. The method of claim 8, wherein the pork belly treating process further comprising pressing the at least one pork belly into a substantially rectangular shape.

10. The method of claim 6, wherein the first end and the second end are each docked up to six inches.

11. A method of processing pork bellies to produce sliced bacon, comprising:

receiving at least two pork bellies, each having a flank end and a shoulder end;

docking the shoulder end from a first pork belly;

docking the flank end from the first pork belly while simultaneously docking the shoulder end from a second pork belly;

placing the docked first pork belly on a slicing machine; and slicing the docked first pork belly to produce sliced bacon.

12. The method of claim 11, further comprising docking the flank end from the second pork belly, placing the docked second pork belly on the slicing machine, and slicing the docked second pork belly to produce sliced bacon.

13. The method of claim 12, wherein the shoulder end and the flank end of each pork belly are docked up to six inches.

14. The method of claim 11, further comprising curing the at least two pork bellies.

15. The method of claim 14, further comprising smoking the at least two pork bellies.

16. The method of claim 15, further comprising chilling the at least two pork bellies.

17. The method of claim 16, further comprising pressing the at least two pork bellies into a substantially rectangular shape.

18. The method of claim 11, further comprising smoking the at least two pork bellies.

19. The method of claim 11, further comprising chilling the at least two pork bellies.

20. The method of claim 11, further comprising pressing the at least two pork bellies into a substantially rectangular shape.

21. A method of processing pork bellies to produce sliced bacon, comprising:
   receiving at least one pork belly, each pork belly having a first end and a second end;
   docking the first end from a pork belly and the second end from a pork belly simultaneously;
   placing the docked pork belly on a slicing machine; and
   slicing the docked pork belly to produce sliced bacon.

22. A method of processing pork bellies to produce sliced bacon, comprising:
   receiving at least one pork belly, each pork belly having a first end and a second end;
   docking the first end and the second end from each pork belly simultaneously;
   placing the docked pork belly on a slicing machine; and
   slicing the docked pork belly to produce sliced bacon.

* * * * *